No. 670,520. Patented Mar. 26, 1901.
F. STITZEL.
PROCESS OF MASHING GRAIN.
(Application filed Dec. 1, 1899.)
(No Model.)
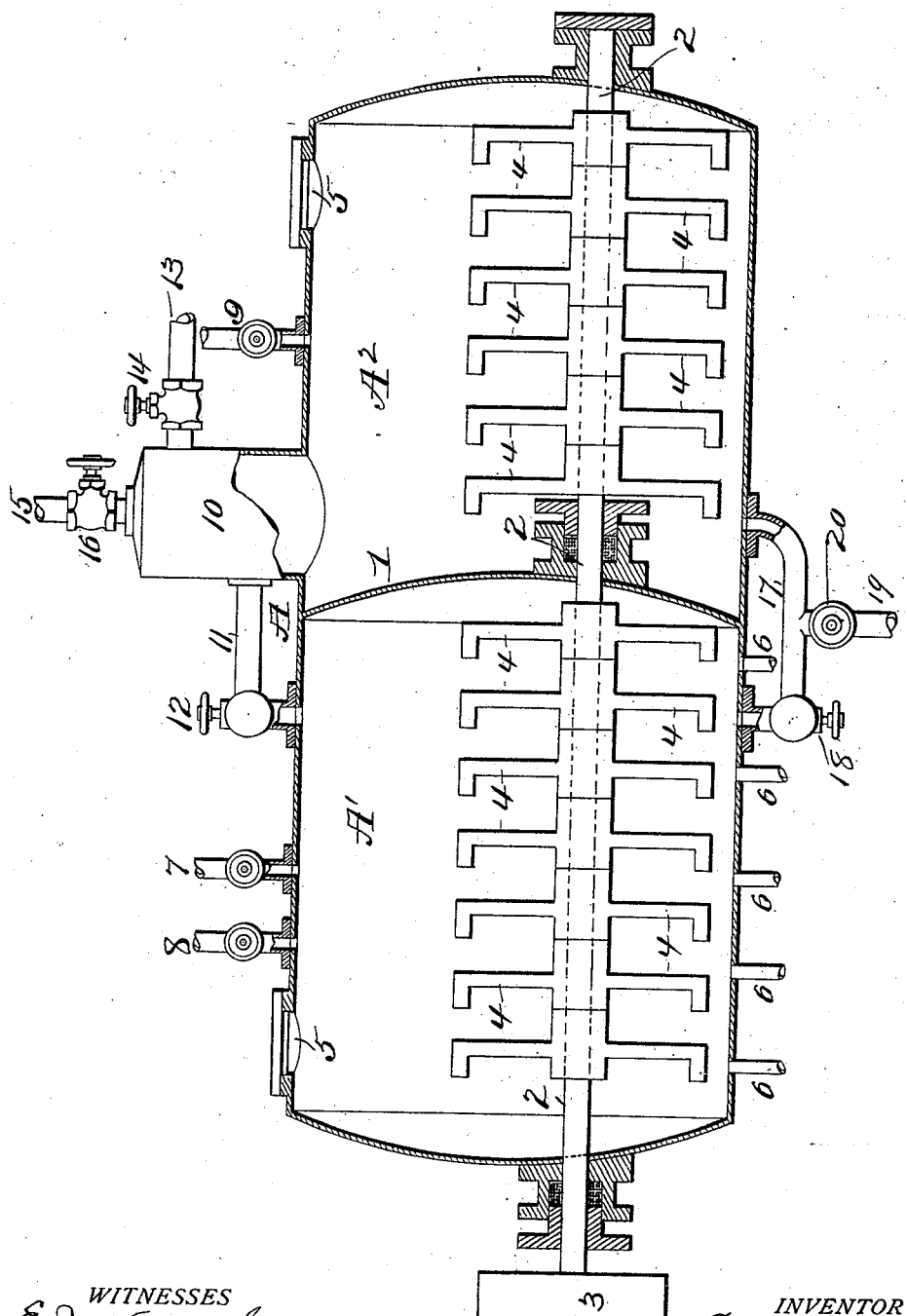
WITNESSES
INVENTOR
Attorney

UNITED STATES PATENT OFFICE.

FREDERICK STITZEL, OF CRESCENT HILL, KENTUCKY.

PROCESS OF MASHING GRAIN.

SPECIFICATION forming part of Letters Patent No. 670,520, dated March 26, 1901.

Application filed December 1, 1899. Serial No. 738,900. (No specimens.)

*To all whom it may concern:*

Be it known that I, FREDERICK STITZEL, a resident of Crescent Hill, in the county of Jefferson and State of Kentucky, have invented certain new and useful Improvements in Processes of Mashing; and I do hereby declare the following to be a full, clear, and exact description of the invention, such as will enable others skilled in the art to which it appertains to make and use the same.

My invention relates to an improved process of mashing grain, the object of the invention being to simplify and improve the processes now in use in such manner as to result in an economical expenditure of steam and prevent the escape of material being treated through the steam-outlet.

With this object in view the invention consists in certain novel steps in the process of mashing, as will be more fully hereinafter described, and pointed out in the claims.

The accompanying drawing is a view in section of an apparatus which may be employed for carrying out my process.

A represents a cylinder provided centrally with a partition 1, forming two chambers A' and A², and a shaft 2 projects longitudinally through the two chambers of the cylinder, passes through the partition 1, and is provided with a pulley 3 outside of the cylinder for the connection of a belt, whereby motion is transmitted to said shaft. A series of agitators 4 are provided on the shaft in each chamber and are adapted to turn with the shaft to agitate the mash in the cylinder. An inlet 5 (for grain) is provided in the top of the cylinder for the chamber A. The chamber A² is provided with a manhole 5ª, through which to examine and cleanse said chamber. Steam-inlet pipes 6 communicate with the base of the chamber A', and an inlet-pipe 7 for water and an inlet-pipe 8 for malt also communicate with the chamber A'. An inlet-pipe 9 for malt communicates with the chamber A², and said pipes 7, 8, and 9 are each provided with suitable valves, as shown. A steam-dome 10, located upon the top of chamber A², communicates therewith and is connected with the chamber A' by a pipe 11, having a valve 12 therein. A vacuum-pump (not shown) is connected with the dome 10 by a pipe 13, having a valve 14 therein, and an exhaust-pipe 15, having a valve 16 therein, also communicates with the dome 10.

The chambers A' and A² are connected at their bases, by a pipe 17, having a valve 18 therein below the chamber A', and a pipe 19, having a valve 20 therein, communicates with the pipe 17 for carrying off the contents of both chambers.

My improved process is as follows: Water is admitted to the chamber A' through pipe 7 and the shaft 2, carrying the agitators 4, started. Ground grain is now admitted through the inlet 5 to practically fill the chamber A', and steam is admitted through the jets or pipes 6 and valves 12 and 16 opened to permit the escape of air from the chamber; but as soon as steam escapes these valves are closed and the steam permitted to flow into the chamber until the temperature reaches about 300° Fahrenheit and a pressure of about seventy pounds to the square inch for the purpose of softening and loosening the cellulose inclosing the soluble starch. The shaft 2 is now stopped and the material left standing for several minutes to obtain the maximum of soluble starch. Valve 18 is then opened, then the valve 12, and later, after the material has divided itself in the two chambers, valve 16 is opened to allow the surplus steam to escape. Afterward the valve 16 is closed and valve 14 opened. The shaft 2 and vacuum-pump are now started, and the material in both chambers is cooled by agitation and vacuum to 160° Fahrenheit. Valves 8 and 9 are opened, and malt previously mixed with water is drawn into both chambers in equal quantities to convert the starch contained therein into sugar. The vacuum-pump is stopped, and after thorough mixing and standing for fifteen minutes or more for saccharification the mash is discharged at 19 by opening the valve 20.

I would have it understood that my process may be carried out in various different apparatuses—as, for instance, I might employ several separate tanks connected by pipes, as above described—and hence I do not wish to be limited to any particular apparatus for carrying out my invention.

Having fully described my invention, what I claim as new, and desire to secure by Letters Patent, is—

1. In a mashing process, first grinding the grain, mixing the same with water, submitting the mixture to the pressure and heat of steam in a closed receptacle, then permitting the steam to force a portion of the mixture into another receptacle, then admitting malt to the mixture in both chambers, and finally drawing off said mixture from both receptacles.

2. The herein-described process, consisting in mixing and agitating ground grain and water in a closed chamber, subjecting said mixture to the direct action of steam to raise the temperature of the mixture and the pressure within the chamber; then discharging a portion of the material into another closed chamber; agitating the material in both chambers and simultaneously reducing the temperature of said material; then adding malt to the material in both chambers and thoroughly mixing the same and finally withdrawing the material from both chambers.

In testimony whereof I have signed this specification in the presence of two subscribing witnesses.

FREDERICK STITZEL.

Witnesses:
PHILIP STITZEL,
W. H. EDINGER.